United States Patent [19]

Armbruckner

[11] Patent Number: 4,583,892
[45] Date of Patent: Apr. 22, 1986

[54] TOOL CHANGER

[75] Inventor: Otto Armbruckner, Riederich, Fed. Rep. of Germany

[73] Assignee: Tiefbohr-Technick Gmblt & Co. KG, Fed. Rep. of Germany

[21] Appl. No.: 463,793

[22] Filed: Feb. 4, 1983

[30] Foreign Application Priority Data

Feb. 11, 1982 [DE] Fed. Rep. of Germany ....... 3204789

[51] Int. Cl.⁴ .............................................. B23C 1/00
[52] U.S. Cl. .................................. 409/136; 409/231; 408/56; 408/59
[58] Field of Search ............... 409/135, 136, 231, 232, 409/234, 233; 29/26 A, 568; 408/56, 57, 59, 705; 279/106, 107, 108, 1 F, 1 TS, 121, 20, 35, 37, 109, 1 SG

[56] References Cited

U.S. PATENT DOCUMENTS

| Re. 26,623 | 7/1969 | Erickson | 409/233 |
| 3,487,748 | 1/1970 | Grage | 409/136 |
| 3,568,566 | 3/1971 | Weidig | 409/233 |
| 3,701,607 | 10/1972 | Johnson | 408/59 |

FOREIGN PATENT DOCUMENTS

| 15248 | 9/1980 | European Pat. Off. | 408/57 |
| 2500236 | 7/1976 | Fed. Rep. of Germany | 279/37 |
| 415288 | 10/1946 | Italy | 279/35 |
| 114878 | 9/1979 | Japan | 408/57 |
| 114610 | 9/1981 | Japan | 408/199 |
| 506469 | 8/1976 | U.S.S.R. | 279/37 |

*Primary Examiner*—Gil Weidenfeld
*Assistant Examiner*—Daniel W. Howell
*Attorney, Agent, or Firm*—Jones, Tullar & Cooper

[57] ABSTRACT

A tool changer for a deep hole drilling tool which has an internal passage for supplying or removing lubricating oil is described. The deep hole drilling tool is received such that it is adjustable in length in a tool receptacle, which on its receiving part has a groove which is engaged by clamping elements. These elements are provided in pivotable fashion in a tool adapter to which the receiving part belongs. They are held in the clamping position by spring-loaded parts and can by unlocked via a shifting sleeve counter to the force of the springs.

14 Claims, 3 Drawing Figures

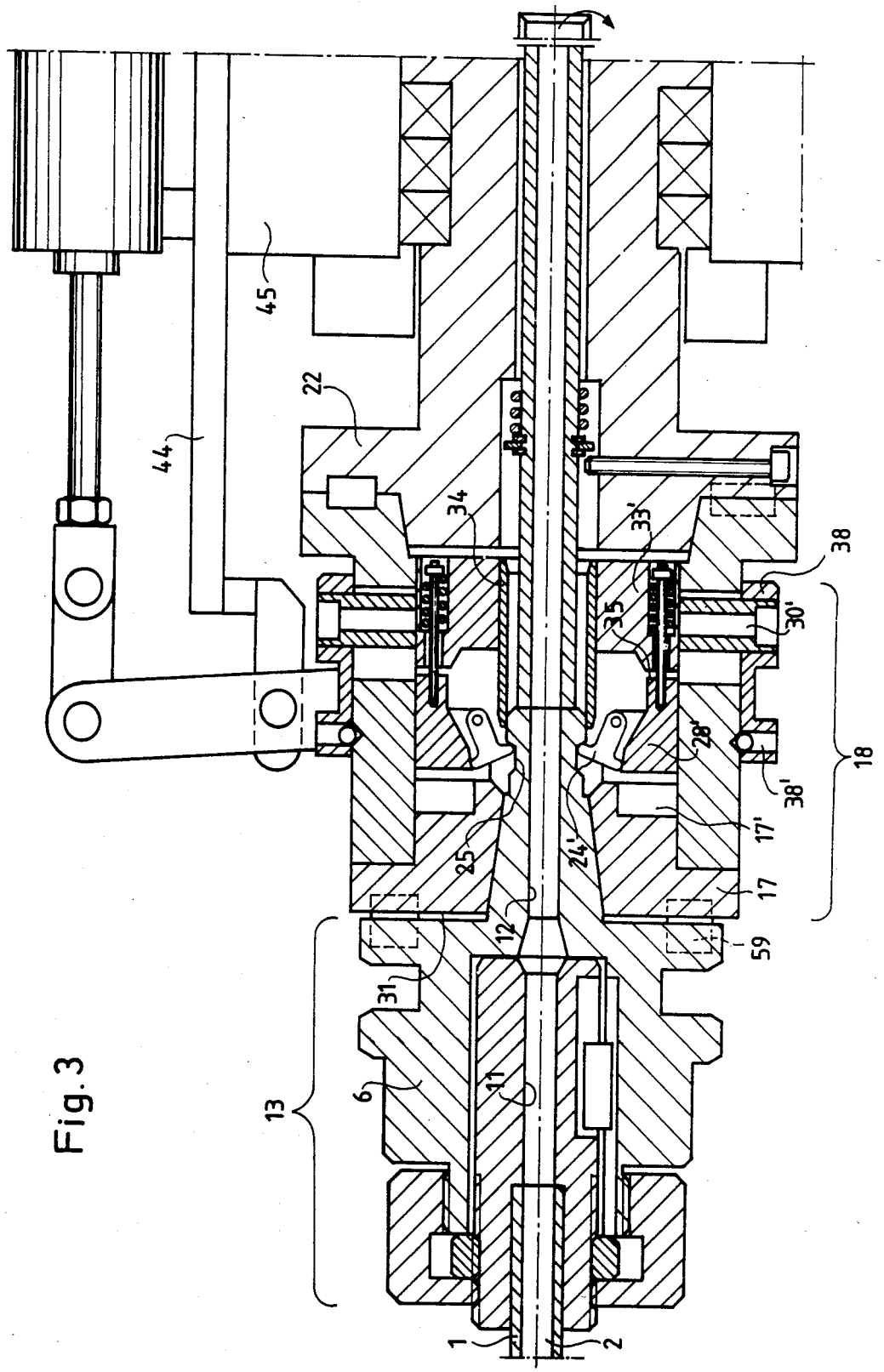

TOOL CHANGER

BACKGROUND OF THE INVENTION

The present invention relates to a tool changer for a deep hole drilling tool having an internal passage for the delivery or removal of the cooling lubricant (soluble cutting oil or lubricating oil), hereinafter referred to as lubricating oil. A tool receptacle in which the deep hole drilling tool is disposed is insertable into a receiving part rotatably driven by the tool spindle of a machine tool.

The distinguishing feature of deep hole drilling tools is that the lubricating oil is guided through a passage in the interior of the drilling tool. In the so-called single-lip drilling method, the lubricating oil is delivered to the drilling location through this internal passage, while the lubricating oil is removed from the drilling location, together with the chips generated by drilling, through a V-shaped groove provided on the outside of the tool shaft. In the so-called BTA method, the delivery of the lubricating oil takes place from the outside, along the circumference of the tool; the lubricating oil and the chips are then removed through the internal passage.

If a change of tools is desired, particularly in automatic tool machines, the problem is to connect this inner passage of the deep hole drilling tool to a corresponding line for delivering or removing lubricating oil, while the tool receptacle with which the deep hole drilling tool is firmly connected is received in a corresponding receiving part on the tool spindle. Known means for solving this problem are expensive to construct and are poorly suited to full automation. There is still no way to insert a deep hole drilling tool having an internal passage, that is disposed in a tool receptacle, into a standardized receiving part in the case where the lubricating oil is delivered or removed at the central part of the tool.

OBJECT AND SUMMARY OF THE INVENTION

It is accordingly the principal object of the present invention to provide a tool changer of the general type discussed above, which is simple in structure and assures rapid changing of the deep hole drilling tool as well as the reliable connection of the supply line or removal line for the lubricating oil. In particular, the intent is to enable a rapid change by means of the simple manipulation of one part (a gripping tool) of an automatic machine tool.

This object is attained in accordance with the present invention in that the tool receptacle is provided with an internal passage which adjoins the internal passage of the deep hole drilling tool; the internal passage of the tool receptacle then, in the axial direction, adjoins a tube received in the tool spindle. The tool receptacle furthermore has a groove surrounding it, which is engaged by clamping elements disposed pivotably in a tool adapter connected in the direction of rotation with the tool spindle, while the tool adapter is connected with the receiving part. When the clamping elements engage the groove, they clamp the tool receptacle in the receiving part.

By the provisions of the present invention, a passage is thus created which extends centrally all the way through the tool changer in the axial direction, adjoining a tube in the interior of the tool spindle, and means are provided for clamping these two parts together in a position of contact. These "clamping elements" are preferably embodied as pawls, which are pivotable inward in the axial direction and are held in the clamping position by individually spring-loaded wedge elements, preferably reinforced by a self-locking action between the wedge elements and the pawls.

Further features of the invention will become apparent from the exemplary embodiments explained in detail below, referring to the attached drawings.

BRIEF DESCRIPTION OF THE DRAWINGS

FIG. 3 shows a second exemplary embodiment of the present invention.

DESCRIPTION OF THE PREFERRED EMBODIMENTS

Figure 1:
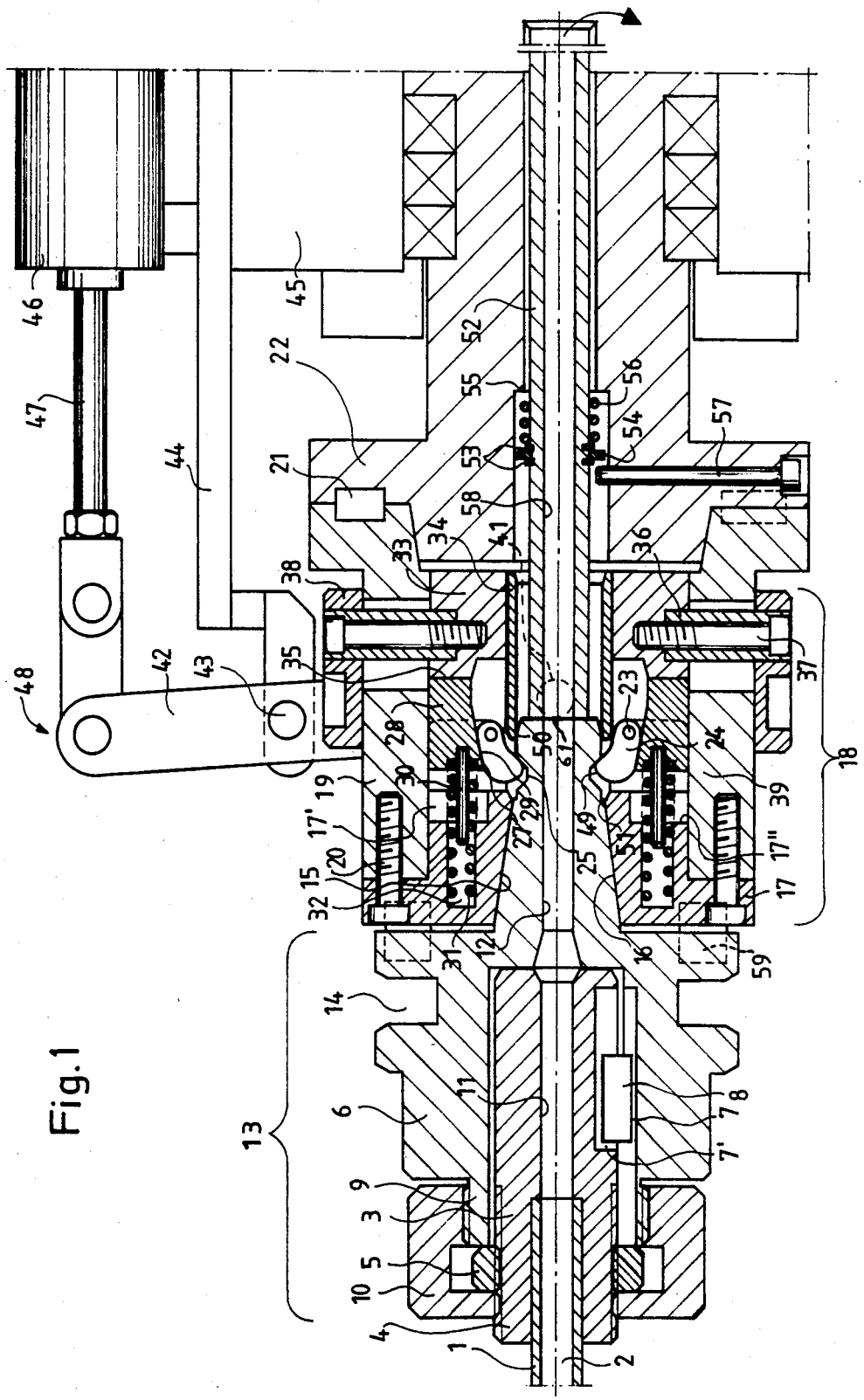
FIG. 1 shows a first exemplary embodiment of the present invention.

In FIG. 1 there is shown a deep hole drilling tool 1 having an internal passage 2. In the so-called single-lip drilling method, the internal passage 2 serves to supply soluble cutting or lubricating oil to the cutting edge of the tool, which is seated on the left-hand end (not shown) of the deep hole drilling tool 1 in FIG. 1. In the so-called BTA method, the lubricating oil is supplied at the outside, on the circumference of the tool, and is removed together with the chips generated via the internal passage 2, which extends through the spindle 22. The exemplary embodiment shown in the drawing has a deep hole drilling tool embodied for the BTA method as its subject; lubricating oil is carried away, together with the chips, from left to right via the internal passage 2, and finally exits from the spindle 22 as indicated by the arrow at the right in FIG. 1.

The deep hole drilling tool 1 is firmly seated in a bushing 3. This is accomplished, for instance, by welding or screwing the bushing 3 onto the deep hole drilling tool 1. The left-hand area of the bushing 3 is provided with an outer thread 4. A stop nut 5 is seated on this outer thread 4. The position of the stop nut 5 determines the position of the tool receptacle 6 relative to the bushing 3. The tool receptacle 6 is connected with the bushing 3 in that a key 8 engages both the groove 7 in the tool receptacle 6 and a groove 7' in the bushing 3. This connection is provided at multiple points along the circumference. On the left, sleeve-like end 9 of the tool receptacle 6, an outer thread is also provided, on which a sleeve nut 10 is disposed. If the sleeve nut 10 is tightened, then the tool receptacle 6 is fixed in the tightened position relative to the bushing 3 which is determined by the position of the stop nut 5 on the outer thread 4. The internal passage 2 continues into the internal passage 11 in the bushing 3, the internal passage 12 in the tool receptacle 6 and the internal passage 58 in the tube 52. The tube 52 is elastically disposed in the tool spindle 22. Alternatively, the internal passage 2 could extend the full length of the bushing 3 so that internal passage 2 connects directly to internal passage 12.

The deep hole drilling tool 1 and tool receptacle 6 form a unit 13, which is intended to be automatically changeable as such with respect to the tool spindle (drill spindle), in the context of a machine tool. Automatic changeability means that a gripping tool (not shown) clasps the unit (for instance, by engagement with the groove 14 on the tool receptacle 6) and simply inserts it into, or removes it from, the tool changer. To this end, the conical shaft 15 of the tool receptacle 6 is provided.

Torque is transmitted by means of a clutch in the form of 59.

To receive the unit 13 in the tool spindle 22, the tool receptacle 6 is inserted into the conical inner face 16 of the receiving part 17 (receiving cone), which is part of a tool adapter 18.

The tool adapter 18 has the receiving part 17 and a flanged adapter cylinder 19, which are connected by means of screws 20. The flange adapter cylinder 19 is coupled in the direction of rotation with the tool spindle 22 by means of driver blocks 21, the tool spindle being driven in a known manner (not shown). The driver blocks engage corresponding grooves in the adapter cylinder 19 and the tool spindle 22.

Along its circumference, the receiving part 17 is provided with a plurality of slots, of which the slots 17' and 17" can be seen. Pawls 24 are pivotably supported in these slots by means of bolts 23. In the illustrated position (the clamping position), the pawls 24 engage a groove 25, which is provided on the hub-like extension 26, extending toward the right, of the tool receptacle 6. In the clamping position, the direction of the rear surfaces 27 of the pawls 24 is not parallel to the axis of the tool changer but rather oblique to it, at a predetermined angle. Wedges 28 rest against the oblique surfaces 27 of the pawls 24. The pawls 24 and the wedges 28 are adapted to one another in such a way that in the clamping position they are self-locking and can be loosened only by the exertion of external force. Thus the tool receptacle 6 is held on the tool spindle 22 because the pawls 24 which engage the groove 25, are held on the receiving part 17, the receiving part 17 is held on the flanged adapter cylinder 19, and the flanged adapter cylinder 19 is held on the tool spindle 22.

Stay bolts 30 are placed in the wedges 28. Springs 31 are pushed over the stay bolts 30, being supported in the receiving part 17 in recesses 32. These springs urge the wedges 28 into the illustrated clamping position.

Also disposed inside the flanged adapter cylinder 19 is a sliding sleeve 33. One component of this sliding sleeve 33 is a separating sleeve 34. The left-hand end 50 of the separating sleeve 34 extends into the space between the pawls 24, as far as the notch 51 on the conical shaft 15 of the tool receptacle 6. The sliding sleeve 33 also has stop faces 35, with which the sliding sleeve 33 presses against the right-hand end of the wedges 28. By means of bushings 36 and screws 37, the sliding sleeve 33 is connected with a sliding collar 38. The bushings 36 and the screws 37 each extend into and through a slot 39 in the flanged adapter cylinder 19. In this manner, the sliding sleeve 33 is thus movably connected with the sliding collar 38 when there is a displacement in the axial direction.

Figure 2:
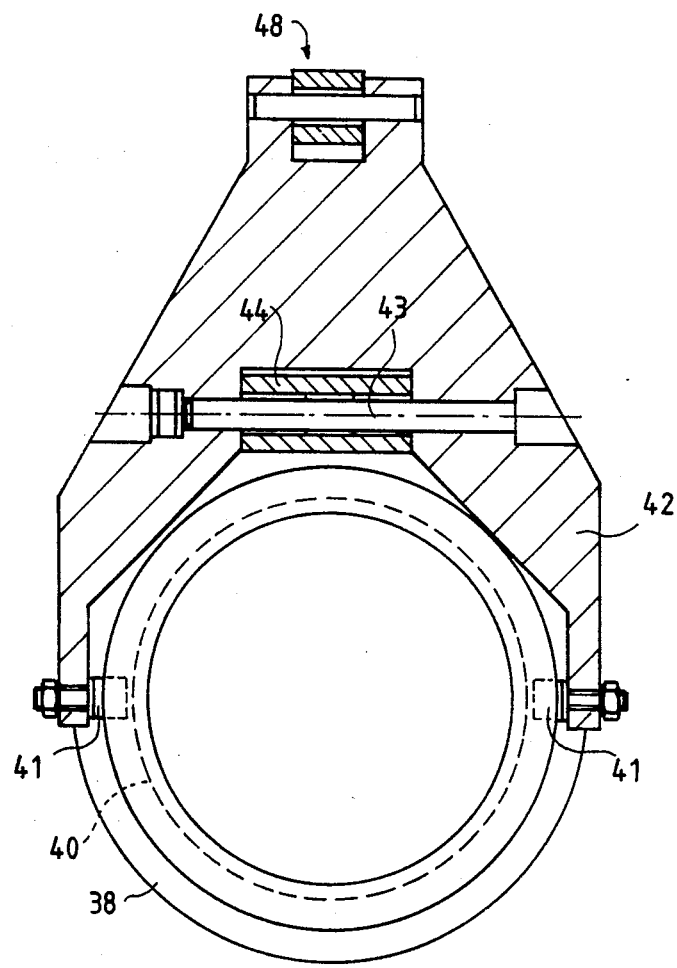
FIG. 2 is a schematic illustration of the shifting fork in a plane perpendicular to that of FIG. 1.

For the purpose of displacement of the sliding collar 38, an annular groove 40 is provided. Claws 41 engage this groove at either side (see FIG. 2). These claws are disposed on a shifting fork 42, which is secured with the aid of a bolt 43 to a bracket 44, which is connected in turn with the spindle housing 45. The movement of the shifting fork 42 is effected with the aid of a hydraulic cylinder 46, the piston rod 47 of which engages the upper end of the shifting fork 42 at 48.

The process of unlocking the unit 13 now proceeds as follows:

The hydraulic cylinder 46 is actuated such that the piston rod 47 and with it the upper end of the shifting fork 42 moves toward the right (FIG. 1). As a result, the sliding collar 38 is displaced toward the left. Since it is connected via bushings 36 and screws 37 with the sliding sleeve 33, this sliding sleeve 33 moves toward the left as well.

This means, first, that the stop faces 35 displace the wedges 28 toward the left. The rear surfaces 27 of the pawls 24 are thus uncovered. The pawls 24 can now pivot outward in the radial direction. Second, along with the sliding collar 38 and the sliding sleeve 33, the separating sleeve 34 moves toward the left as well and meets the radius 49 of the pawls 24. This compels the pivoting movement of the pawls 24 toward the outside. The pawls 24 thus move out of the groove 25 of the tool receptacle 6 and thus leave this groove 25 free. This movement continues until such time as the left front end 50 of the separating sleeve 34, with its end face, strikes against the notch 51, which acts as a stop. As a result of this impact, the tool receptacle 6 in the receiving part 17, or in the conical recess 32 thereof, is freed. The sliding sleeve 33 with the separating sleeve 34 moves until the separating sleeve 34 rests against the notch 51 and thus seals off the space in which the pawls 24 and the wedges 28 are disposed against the entry of chips and the like.

In this unlocked position, the tool receptacle 6 can thus be moved by a gripping tool or the like out of engagement with the receiving part 17 of the tool adapter. A different tool can then be inserted.

The clamping effect is attained in that the hydraulic shifting cylinder 46 displaces the piston rod 47 toward the left (FIG. 1). Accordingly, the sliding collar 38 moves toward the right. The wedges 28 are then moved toward the right as well by means of the springs 31. The oblique faces 29 of the wedges 28 thereby press once again against the rear surfaces 27 of the pawls 24 and hold the pawls 24 radially inwardly in the position in which there is a self-locking relationship between the two and the tool adapter is clamped.

The removal of the lubricating oil in the BTA method (or the supply thereof, in the case of the single-lip drilling method) is effected, as already noted, via the internal passage 2 of the deep hole drilling tool 1 and, adjoining it, via the internal passage 12 of the tool receptacle 6. The internal passage 12 of the tool receptacle 6 meets the internal passage 58 of the tube 52 which is under spring pressure. On this tube, a collar 54 is formed with the aid of two Seeger rings 53. A spring 56 is disposed between the collar 54 and a stop shoulder 55 in the tool spindle 22, biasing the collar 54 and thus the tube 52 toward the left, so that the left end edge 61 of the tube 52 presses against the right end edge 60 of the tool receptacle 6 and thus forms a seal therewith. During a tool change, the movement of the tube 52 and thus of the collar 54 toward the left is limited by a pin 57, which is disposed in the tool spindle 22.

In the second exemplary embodiment according to FIG. 3, one stay bolt 30' is screwed into each wedge 28'. The stay bolts 30' pass through the sliding sleeve 33' and via a spring 31' drag the wedges 28' with them, so that each pawl 24' rests, via spring force, in the groove 25, thus clamping the tool receptacle 6 in the receiving part 17. Otherwise, the same elements are identified with the same numerals in FIG. 3 as in FIG. 1.

It should additionally be noted that in both exemplary embodiments a hydraulic actuation has been described. However, a pneumatic, mechanical, electromotor or electromagnetic actuation is also conceivable.

A modification of the exemplary embodiments described is also conceivable in which the actuation of the sliding sleeve 33 or 33' via the sliding collar sleeve 38 is replaced by a type of actuation effected via the end of the spindle 22, for instance by means of a pin disposed in an axially displaceable manner in the spindle, the pin, acting in the axial direction upon the sliding sleeve 33 or 33', or in other words displacing it.

The exemplary embodiments have furthermore been described in terms of the so-called BTA and single-lip drilling methods, in which, as noted, the lubricating oil is supplied at the outside at the circumference of the tool or in the interior of the tool and thence carried to the drilling location and is removed, carrying the chips with it, through an internal passage 2 of the tool. However, the invention is also applicable to the so-called ejector drilling method, which is based on a double-tube structure.

It should also be noted that the tool receptacle 6 may be provided not only with a conical receptacle, as described herein, but also with a cylindrical receptacle.

What is claimed is:

1. A tool changer for receiving a deep hole drilling tool and connecting it to the spindle of a machine tool for rotation therewith, said deep hole drilling tool being provided with an internal passage for supplying or removing, respectively, a lubricating and/or cooling liquid to or form the forward end of the deep hole drilling tool, and said spindle of the machine tool being provided with an internal passage for supplying or removing respectively, the lubricating and/or cooling liquid to or from the internal passage of the deep hole drilling tool, said tool changer comprising:

a receptacle for receiving the deep hole drilling tool for rotation therewith said receptacle being provided with a conical extension and with an internal passage extending therethrough for communicating with the internal passage of the tool, said conical extension includes an annular groove;

an adapted connected to the spindle of the machine tool for rotation therewith, said adapter being provided with an inner conical opening to receive said concial extension of said receptacle;

clutch means connected between the receptacle and the adapter for transmitting rotational movement from the adapter to the receptacle;

tube means positioned within the internal passage of the spindle, said tube means defining an internal passage;

first biasing means engageable with the tube means for biasing said tube means toward the adapter;

a series of claimping means arranged circumferentially about the adapter to surround the concial extension of the receptacle and assume a clamping position for engagement with the conical extension of the receptacle, whereby engagement of the clamping means and the conical extension of the receptacle urges the conical extension of the receptacle into the conical opening of the adapter, such that the end of the receptacle is urged into sealing engagement against the tube means in a direction opposite to the biasing force exerted by said first biasing means, and further such that the internal passage of the adapter and the internal passage of the tube means are in communication, said clamping means including a series of clamping elements pivotably disposed for engagement with the annular groove, and a series of wedge elements operatively associated with a respective one of the clamping elements; and a series of second biasing means, each of which acts individually on one of said clamping means to hold its respective clamping means in engagement with said concial extension of said receptacle wherein said wedge elements are urged by a respective one of said second biasing means to produce a self-locking effect of its respective clamping element.

2. The tool changer as defined in claim 1, further comprising:
separating means for engaging and moving said clamping means out of the clamping position.

3. The tool changer as defined in claim 2, further comprising:
actuating means, and wherein:
said separating means includes a sleeve mounted within the adapter for axial displacement therein by said actuating means.

4. The tool changer as defined in claim 3, further wherein:
the adapter defines a space for receiving the clamping elements; and
the sleeve seals off the space in the adapter during the axial displacement of the sleeve and movement of the clamping elements out of the clamping position.

5. The tool changer as defined in claim 3, further wherein:
the adapter includes a sleeve engaging surface; and
the sleeve engages the sleeve engaging surface of the adapter and loosens the receptacle as a result of the axial displacement of the sleeve and movement of the clamping elements out of the clamping position.

6. The tool changer as defined in claim 3, further wherein:
said actuating means includes a sliding collar mounted to the tool adapter and coupled to the sleeve; and
drive means for producing the axial displacement of the sleeve through said sliding collar.

7. The tool changer as defined in claim 6, further wherein:
said drive means comprises hydraulic drive means.

8. The tool changer as defined in claim 6, further wherein:
said drive means comprises mechanical drive means.

9. The tool changer as defined in claim 6, further wherein:
said drive means comprises electro-magnetic drive means.

10. The tool changer as defined in claim 6, further wherein:
said drive means comprises pneumatic drive means.

11. The tool changer as defined in claim 6, further wherein:
said drive means comprises an electromotor.

12. The tool changer as defined in claim 1, wherein:
the conical extension of aid receptacle includes an annular groove; and
said clamping elements are urged by respective ones of said second biasing means into engagement with the annular groove.

13. The tool changer as defined in claim 1, further wherein:
each clamping element includes a rear surface and each wedge element includes an oblique surface which is engaged by the rear surface of a respective clamping element; and said wedge elements press against their respective clamping elements at their engaged surfaces, thereby pivoting said clamping elements radially inwardly into the clamping position to effect said self-locking.

14. The tool changer as defined in claim 13, further wherein:
the annular groove defines a stop surface; and
each clamping element in urged into engagement with the stop surface during said self-locking.

* * * * *

UNITED STATES PATENT AND TRADEMARK OFFICE
CERTIFICATE OF CORRECTION

PATENT NO. : 4,583,892

DATED : April 22, 1986

INVENTOR(S) : Armbruckner

It is certified that error appears in the above-identified patent and that said Letters Patent is hereby corrected as shown below:

Claim 1, line 18, "adapted" should be --adapter--;

Claim 1, lines 21, 30 and 52 "concial" should be --conical--;

Claim 1, line 30, "claimping" should be --clamping--.

Claim 12, line 2 "aid" should be --said--.

Claim 14, line 4, "in" should be --is--.

Signed and Sealed this

Tenth Day of March, 1987

*Attest:*

DONALD J. QUIGG

*Attesting Officer*    *Commissioner of Patents and Trademarks*